US012706765B2

(12) United States Patent
Tokunaga et al.

(10) Patent No.: US 12,706,765 B2
(45) Date of Patent: Aug. 11, 2026

(54) ELECTRONIC COMMUNICATION SYSTEM AND SIGNAL TRANSMISSION METHOD

(71) Applicant: HONDA MOTOR CO., LTD., Tokyo (JP)

(72) Inventors: Tomoya Tokunaga, Tokyo (JP); Tatsuroh Saitoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 598 days.

(21) Appl. No.: 18/177,214

(22) Filed: Mar. 2, 2023

(65) Prior Publication Data

US 2023/0318861 A1 Oct. 5, 2023

(30) Foreign Application Priority Data

Mar. 31, 2022 (JP) ................................ 2022-061003

(51) Int. Cl.
*H04L 12/12* (2006.01)
*H04L 12/40* (2006.01)

(52) U.S. Cl.
CPC ........ *H04L 12/12* (2013.01); *H04L 12/40039* (2013.01); *H04L 2012/40215* (2013.01)

(58) Field of Classification Search
CPC ............... H04L 12/12; H04L 12/40039; H04L 2012/40215; H04L 67/12; B60R 16/0231
See application file for complete search history.

(56) References Cited

U.S. PATENT DOCUMENTS 6,529,530 B1 3/2003 Ichii et al.
2011/0208884 A1* 8/2011 Horihata ........... H04L 12/40143 710/105

(Continued)

FOREIGN PATENT DOCUMENTS

CN 113472618 A 10/2021
CN 115804065 A * 3/2023 ............ H05B 47/19

(Continued)

OTHER PUBLICATIONS

PE2E Search machine language translation of WO_2022102309_A1 (Year: 2022).*

(Continued)

*Primary Examiner* — Sujoy K Kundu
*Assistant Examiner* — Vladislav Y Agureyev
(74) *Attorney, Agent, or Firm* — Rankin, Hill & Clark LLP

(57) ABSTRACT

An electronic communication system includes: a vehicle control unit that controls a functional unit mounted in a vehicle; and a higher-order control unit, wherein the vehicle control unit and the higher-order control unit are connected through a lower-order communication line, a plurality of the higher-order control units are connected to each other through a higher-order communication line, and the higher-order control unit starts up from a sleep state in response to receiving a first wake-up signal from the vehicle control unit through the lower-order communication line, determines a first transmission period, based on a time period required for another higher-order control unit connected to the higher-order control unit through the higher-order communication line to start up, and transmits a second wake-up signal to the another higher-order control unit at regular intervals of the determined first transmission period.

7 Claims, 6 Drawing Sheets

(56) References Cited

U.S. PATENT DOCUMENTS

2011/0223955 A1* 9/2011 Kobayashi .......... H04L 12/4625 455/513
2011/0320079 A1* 12/2011 Yasuda .......... G06F 9/52 701/1
2013/0044658 A1 2/2013 Zhu et al.
2013/0201817 A1* 8/2013 Jiang .......... H04L 41/0659 370/217
2013/0326255 A1* 12/2013 Kodama .......... H04L 12/40039 713/323
2014/0282470 A1* 9/2014 Buga .......... G06F 8/65 717/170
2019/0215770 A1* 7/2019 Delibie .......... H04W 4/70
2019/0258469 A1* 8/2019 Hayashidera .......... H04L 67/34
2020/0026339 A1* 1/2020 Sebastian .......... H04L 43/16
2020/0177411 A1 6/2020 Robbins et al.
2020/0223394 A1* 7/2020 Tamaru .......... B60R 25/40
2021/0086761 A1* 3/2021 El Assaad .......... H04W 52/287
2021/0357344 A1* 11/2021 Rennig .......... H04L 43/55
2022/0001835 A1* 1/2022 Kim .......... B60R 25/00
2022/0191058 A1* 6/2022 Ishii .......... H04L 12/40
2022/0329358 A1* 10/2022 Fung .......... G06F 1/3209
2023/0075700 A1* 3/2023 Rocroi .......... B60R 25/245
2023/0226996 A1* 7/2023 Bok .......... B60R 16/033 340/457.1
2023/0264641 A1* 8/2023 Staudt .......... B60W 10/26 701/22
2023/0299987 A1* 9/2023 Yao .......... H04L 12/1854 370/389
2023/0371050 A1* 11/2023 Van Phan .......... H04W 72/40
2024/0181982 A1* 6/2024 Aoyama .......... B60R 16/02
2024/0211229 A1* 6/2024 Xiong .......... G06F 8/61
2024/0257590 A1* 8/2024 Sanji .......... G07C 9/00309
2024/0283676 A1* 8/2024 Go .......... H04L 12/4625
2024/0305474 A1* 9/2024 Wang .......... H04L 9/3255

FOREIGN PATENT DOCUMENTS

DE 102018007403 A1 * 4/2019 .......... H02J 7/1446
GB 2608802 A * 1/2023 .......... H04L 67/12
GB 2615811 A * 8/2023 .......... B60R 16/0231
JP 11-187050 A 7/1999
JP 2008-283492 A 11/2008
JP 2004-254196 A 9/2009
JP 2011-004276 A 1/2011
JP 2014-28547 A 2/2014
JP 2017-076838 A 4/2017
JP 2021-048477 A 3/2021
JP 2023058255 A * 4/2023 .......... G06F 21/31
KR 10-2020-0140542 A 12/2020
WO WO-2011108114 A1 * 9/2011 .......... B60W 30/19
WO 2021/093743 A1 5/2021
WO WO-2022102309 A1 * 5/2022 .......... H04L 12/40

OTHER PUBLICATIONS

Japanese Office Action dated Jan. 16, 2024, Application No. 2022-061003; English translation included, 5 pages.
Jan R. Seyler et al., “A Self-Propagating Wakeup Mechanism for Point-to-Point Networks with Partial Network Support”, Design, Automation & Test in Europe Conference & Exhibition, IEEE , 2014; 6 pages.
Chinese Office Action Corresponding to Chinese Application No. CN202310202303.A, issued Jan. 22, 2026, 14 pages.
Chinese Office Action Corresponding to Application No. 202310202303.0, dated Jun. 24, 2026, 7 pages.

* cited by examiner

T1
T2
T3
T4
T5
T6
T7
T8
T9
20ms
20ms
75ms
75ms
50ms
50ms
50ms
50ms
32ms
140ms
170ms
D
E
W
F
G
LT1
LT2
(a) ENTRY CONTROL UNIT
(b) ZONE B-ECU
(c) CENTRAL ECU
(d) ZONE A-ECU
(e) GEARSHIFT CONTROL UNIT

FIG.6

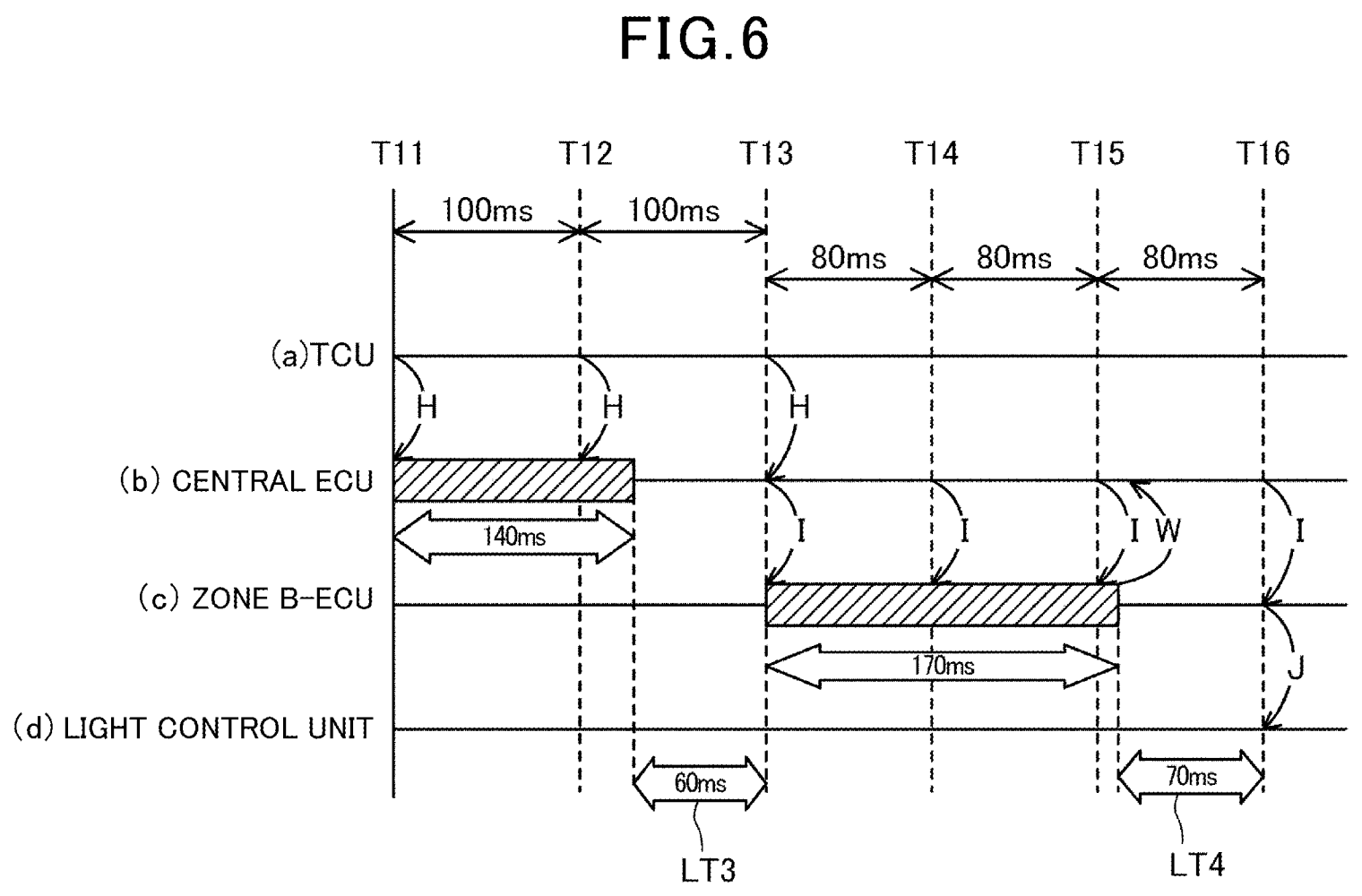

T11
T12
T13
T14
T15
T16
100ms
100ms
80ms
80ms
80ms
(a)TCU
(b) CENTRAL ECU
(c) ZONE B-ECU
(d) LIGHT CONTROL UNIT
H
H
H
I
I
I W
I
J
140ms
170ms
60ms
70ms
LT3
LT4

ELECTRONIC COMMUNICATION SYSTEM AND SIGNAL TRANSMISSION METHOD

INCORPORATION BY REFERENCE

The present application claims priority under 35 U.S.C. § 119 to Japanese Patent Application No. 2022-061003 filed on Mar. 31, 2022. The content of the application is incorporated herein by reference in its entirety.

BACKGROUND OF THE INVENTION

Field of the Invention

The present invention relates to an electronic communication system and a signal transmission method.

Description of the Related Art

In recent years, vehicle functions have been advancing. For example, achievements of research and development related to fuel economy improvement, which contribute to energy efficiency, are applied to vehicles, and functionality of an ECU (Electronic Control Unit) that controls an engine or a motor has become increasingly sophisticated. With such technological evolution, the number of ECUs mounted in a vehicle tends to increase, and more efficiency in communication between ECUs is demanded. For example, Japanese Patent Laid-Open No. 2014-28547 discloses a method in which, in an in-vehicle network system configured by using a LAN such as a CAN (Controller Area Network), a transmission period of a communicated message is changed to a preset transmission period, based on a state of a vehicle.

Incidentally, in a vehicle equipped with many ECUs, electricity consumed by the ECUs is unignorable if all of the ECUs are always left in operating states. Accordingly, it is conceivable that the ECUs are caused to transition to a low electricity consumption state such as sleep. However, an ECU in the low electricity consumption state needs to be woken up before the ECU performs an operation. It is therefore feared that responsiveness may be impaired when an ECU is caused to transition to the low electricity consumption state.

The present invention has been made in light of such background, and an object thereof is to enhance responsiveness when a control unit mounted in a vehicle is woken up from the low electricity consumption state.

SUMMARY OF THE INVENTION

An aspect to achieve the above object is an electronic communication system including: a vehicle control unit that controls a functional unit mounted in a vehicle; and a higher-order control unit, wherein the vehicle control unit and the higher-order control unit are connected through a lower-order communication line, and a plurality of the higher-order control units are connected to each other through a higher-order communication line, and the higher-order control unit starts up from a sleep state in response to receiving a first wake-up signal from the vehicle control unit through the lower-order communication line, determines a first transmission period, based on a time period required for another one of the higher-order control units to start up, the another higher-order control unit being connected to the higher-order control unit through the higher-order communication line, and transmits a second wake-up signal to the another higher-order control unit at regular intervals of the determined first transmission period.

According to the configuration as described above, responsiveness can be enhanced when the higher-order control unit is woken up, with the electronic communication system including the control units mounted in the vehicle. Thus, the control units can be placed into sleep, without responsiveness in signal transmission being impaired. Accordingly, energy efficiency improvement in the electronic communication system in the vehicle can be achieved by appropriately placing the control units mounted in the vehicle into sleep.

BRIEF DESCRIPTION OF THE DRAWINGS

FIG. 6 is a timing chart showing an example of the operation of the vehicle control system.

DETAILED DESCRIPTION OF THE PREFERRED EMBODIMENT

Figure 1:
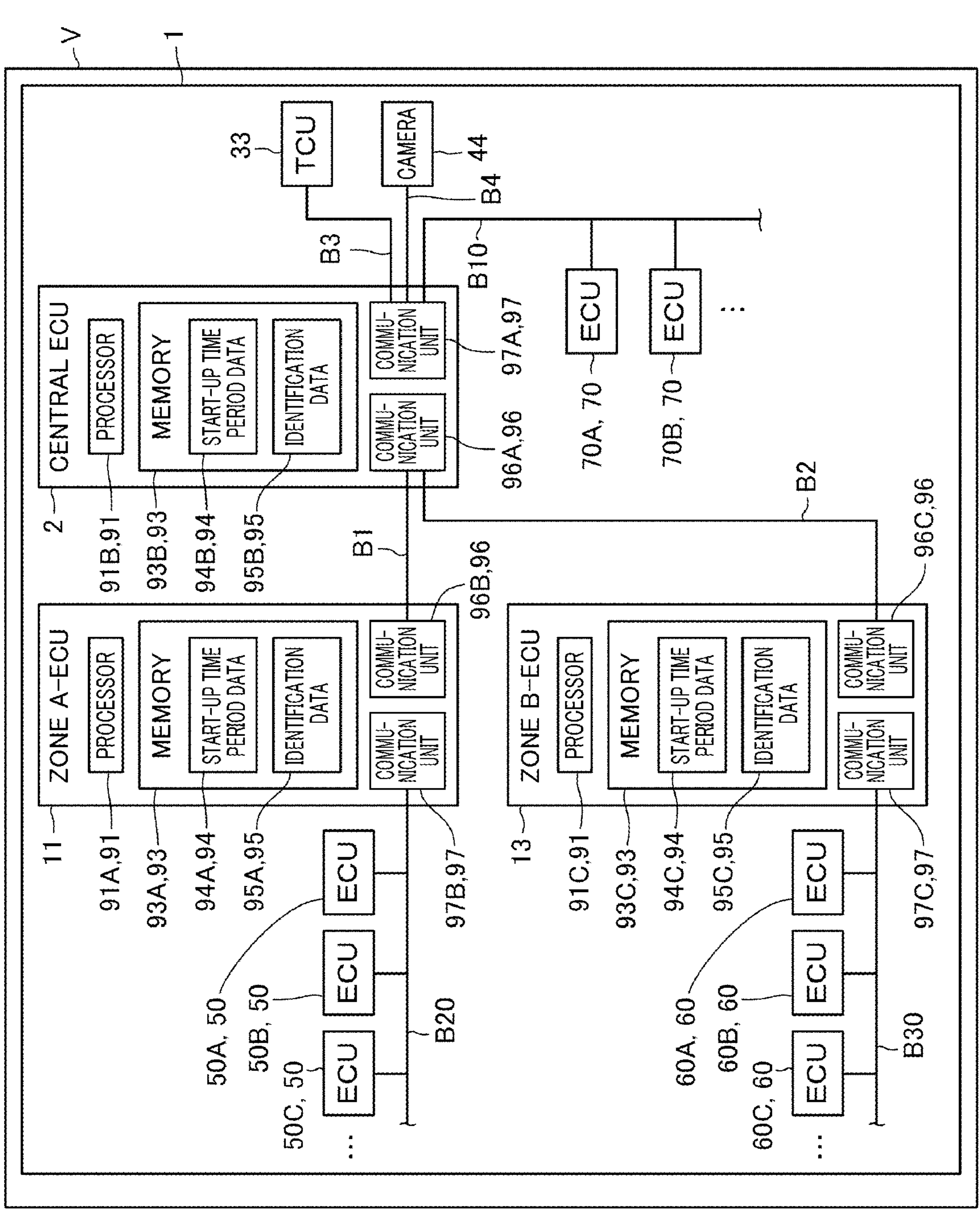
FIG. 1 is a schematic configuration diagram of a vehicle control system.
Figure 2:
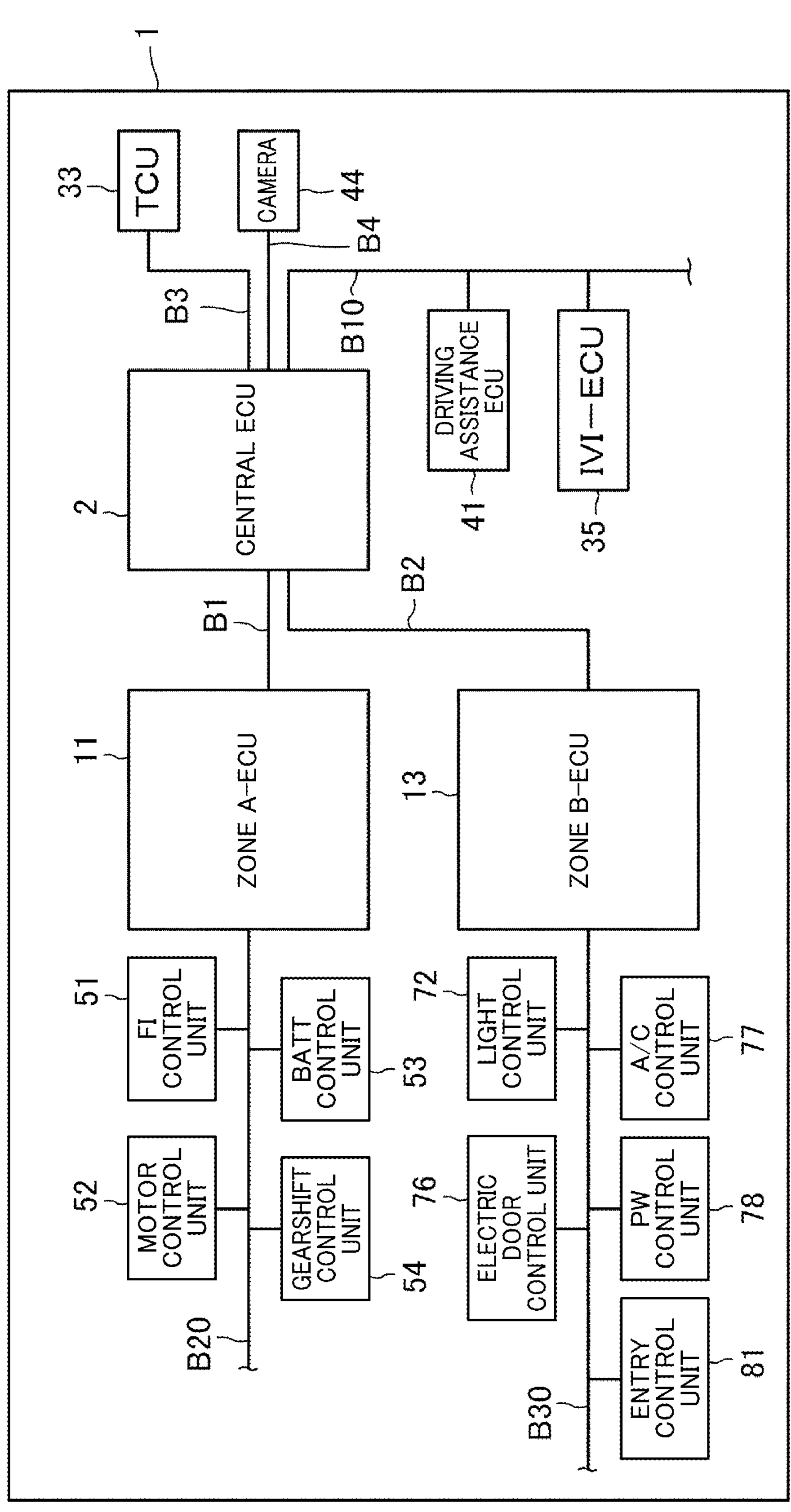
FIG. 2 shows an example of a specific configuration of the vehicle control system.

FIG. 1 shows a vehicle control system 1. FIG. 2 shows an example of a specific configuration of the vehicle control system 1.

The vehicle control system 1 includes a plurality of ECUs that controls functional units mounted in a vehicle V. The vehicle control system 1 implements travel of the vehicle V and various functions of the vehicle V, by controlling the functional units of the vehicle V. The vehicle control system 1 corresponds to an example of an electronic communication system in the present disclosure.

The vehicle V equipped with the vehicle control system 1 is, for example, a four-wheeled automobile. A specific form of the vehicle V is not limited. The vehicle V may be a motorcycle or any other mobile object. The vehicle V may be a vehicle that uses an internal combustion engine for a drive source, may be an electric vehicle that uses a motor for a drive source, or may be a hybrid vehicle that uses an internal combustion engine and a motor.

In FIG. 1, the ECUs included in the vehicle control system 1 are generalized to be shown, and specific examples of the ECUs in the vehicle control system 1 are shown in FIG. 2. The figures show examples of the various ECUs mounted in the vehicle V and examples of equipment controlled by the ECUs. Each ECUs includes a processor and a memory. There is no intention to impose such a limitation that a vehicle V to which the present disclosure is applied should include all the ECUs in the vehicle control system 1 shown in FIGS. 1 and 2 and all the functional units that will be described below. For example, the present disclosure can be applied also to a vehicle V that does not include one or some of the ECUs shown in FIG. 2, and also to a vehicle V equipped with an ECU that is not shown in FIG. 2. Moreover, there is no intention to limit the scope of application of the present disclosure either, with respect to functional units to be controlled that are connected to the ECUs.

The vehicle control system 1 includes a central ECU 2 that performs entire control of the vehicle V and information processing. The central ECU 2 is connected to communication lines including a communication line B1, a communication line B2, and a communication line B10. The central ECU 2 implements functionality of a gateway that manages communication of communicated data between the communication lines. The central ECU 2 corresponds to an example of a higher-order control unit in the present disclosure.

A zone A-ECU 11 and a zone B-ECU 13 are connected to the central ECU 2 through the communication line B1 and through the communication line B2, respectively. One or more ECUs are further connected to each of the zone A-ECU 11 and the zone B-ECU 13.

For example, ECUs 50A, 50B, 50C, . . . are connected to the zone A-ECU 11 through a communication line B20. ECUs 60A, 60B, 60C, . . . are connected to the zone B-ECU 13 through a communication line B30. Hereinafter, the ECUs 50A, 50B, 50C, . . . are referred to as ECUs 50 when not discriminated from each other, and the ECUs 60A, 60B, 60C, . . . are referred to as ECUs 60 when not discriminated from each other. The ECUs 50 are ECUs that are controlled by the zone A-ECU 11, and the ECUs 60 are ECUs that are controlled by the zone B-ECU 13.

The zone A-ECU 11 manages communication of communicated data between the central ECU 2 and the ECUs 50. The zone B-ECU 13 manages communication of communicated data between the central ECU 2 and the ECUs 60.

Moreover, ECUs 70A, 70B, . . . are connected to the central ECU 2 through the communication line B10. The ECUs 70A, 70B are referred to as ECUs 70 when not discriminated from each other. The ECUs 70 can be said to be ECUs that are controlled by the central ECU 2.

A TCU (Telematics Control Unit) 33 is connected to the central ECU 2 through a communication line B3. The TCU 33 is a wireless communication device that includes a communication antenna and a communication circuit, which are not depicted, and performs wireless data communication by using a cellular communication scheme such as LTE (Long Term Evolution) or 5G (fifth generation mobile communication scheme). The TCU 33 is an example of a functional unit that is controlled by the central ECU 2.

Moreover, a camera 44 is connected to the central ECU 2 through a communication line B4. The camera 44 captures images of an inside of a vehicle cabin of the vehicle V and an outside of the vehicle V. For example, the camera 44 may be an MVC (Multi View Camera) system including a plurality of cameras. The central ECU 2 can control and cause the camera 44 to capture an image, and can acquire and analyze the image captured by the camera 44.

FIG. 2 shows an example of the configuration of the vehicle control system 1 including specific examples of the ECUs 50, 60, 70. In the example in FIG. 2, an IVI (In-Vehicle Infotainment)-ECU 35 is connected to the central ECU 2 through the communication line B10. To the IVI-ECU 35, in-vehicle equipment is connected, such as a car navigation system, various cameras including a rear camera, an audio player, a monitor, a touch panel, operation terminals such as a key and a switch, a speaker, and a microphone. The IVI-ECU 35 provides various information and entertainment to an occupant of the vehicle V by controlling the in-vehicle equipment. For example, the IVI-ECU 35 performs control for starting and stopping the in-vehicle equipment, control for outputting to the in-vehicle equipment data or the like detected by another ECU through a sensor, and the like.

A driving assistance ECU 41 is connected to the communication line B10 that connects to the central ECU 2. The driving assistance ECU 41 performs control for automatically parking the vehicle V in a parking position, or an assistance function when a driver parks the vehicle V. Functional units that are controlled by the driving assistance ECU 41 include, for example, the various cameras, the monitor, the touch panel, a steering system, a brake mechanism, and an accelerator system that are mounted in the vehicle V.

An FI (Fuel Injection) control unit 51, a motor control unit 52, a BATT (Battery) control unit 53, and a gearshift control unit 54 are connected to the zone A-ECU 11 through the communication line B20. Such control units are examples of the ECUs 50, and can be said to be functional units that are controlled by the zone A-ECU 11.

The FI control unit 51 performs control of an amount of fuel injected and a timing of injecting fuel in an internal combustion engine mounted in the vehicle V. Functional units that are controlled by the FI control unit 51 include an electronically controlled fuel injection device, and may include sensors and the like. Examples of the sensors and the like include an O2 sensor, a knocking sensor, a cam angle sensor, a crank angle sensor, an intake air temperature sensor, and an exhaust gas temperature sensor.

The motor control unit 52 controls motor speed of the motor mounted in the vehicle V. Functional units that are controlled by the motor control unit 52 include an inverter circuit that supplies drive current to the motor, and may include various sensors. The BATT control unit 53 performs control related to a travel battery mounted in the vehicle V. The BATT control unit 53 performs charge control and discharge control, as well as management of a remaining amount of charge, for the travel battery. The travel battery as a functional unit that is controlled by the BATT control unit 53 is a power supply for travel of the vehicle V. The travel battery is provided separately from a start battery that supplies electricity to each part of the vehicle control system 1, and is mounted in the vehicle V to provide a drive power supply for the motor. For example, the travel battery is any of a lithium-ion secondary battery, a lithium polymer battery, a nickel-metal-hydride battery, an all-solid-state battery, and any other secondary battery, or may be a capacitor. Functional units that are controlled by the BATT control unit 53 may include, in addition to the travel battery, a regenerative mechanism that generates regenerative electricity by using travel energy of the vehicle V. In contrast, the start battery of the vehicle V is a secondary battery that supplies electricity to each part of the vehicle control system 1 when the power supply of the vehicle V is in an off state, and that is charged by an electricity generation device mounted in the vehicle V while the vehicle V is traveling. For example, the start battery includes a lead-acid battery, any other secondary battery, or a capacitor.

Figure 4:
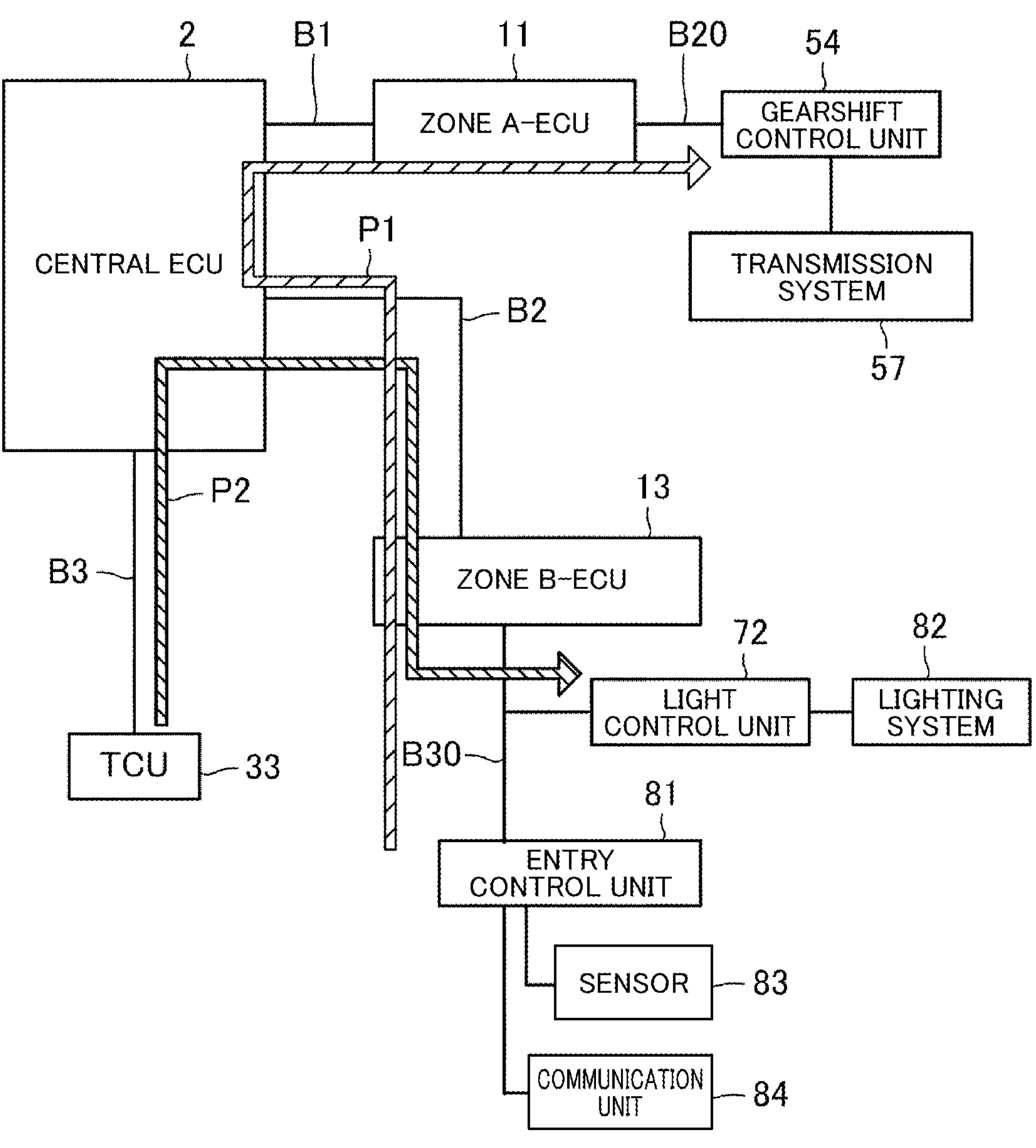
FIG. 4 is a schematic diagram showing an example of the operation of the vehicle control system.

A functional unit that is controlled by the gearshift control unit 54 is, for example, a transmission system 57 (FIG. 4). The gearshift control unit 54 controls the transmission system 57, according to a traveling state of the vehicle V and an operation made by the driver. Examples of the transmission system 57 include a step AT (Automatic Transmission), a CVT (Continuously Variable Transmission), and a DCT (Dual Clutch Transmission). Functional units that are controlled by the gearshift control unit 54 may include a gearshift position sensor, a gearshift switch, a shift lever, and the like.

A light control unit 72, an electric door control unit 76, an A/C control unit 77, a PW (Power Window) control unit 78, and an entry control unit 81 are connected to the zone B-ECU 13 through the communication line B30. Such control units are examples of the ECUs 60, and can be said to be functional units that are controlled by the zone B-ECU 13.

A functional unit that is controlled by the light control unit 72 is a lighting system 82 (FIG. 4). The lighting system 82 includes lights mounted in the vehicle V. Specifically, the lighting system 82 includes headlights, direction indicator lights, fog lights, brake lights, and backup lights of the vehicle V, and may include lights that illuminate the inside of the vehicle cabin of the vehicle V and the outside of the vehicle V.

Functional units that are controlled by the electric door control unit 76 are, for example, actuators provided at opening and closing portions of the vehicle V. The actuators include, for example, motors for opening and closing an electric sliding door and an electric rear gate, and an actuator for unlocking a lock of an electric trunk lid. The actuators that are controlled by the electric door control unit 76 may also include actuators for locking and unlocking door locks provided at the opening and closing portions. By controlling the actuators, the electric door control unit 76 causes the actuators to lock or unlock the door locks of the vehicle V, and to open or close the electric sliding door and the electric rear gate.

A functional unit that is controlled by the A/C control unit 77 is an air conditioning system (A/C) of the vehicle V. By controlling the air conditioning system, the A/C control unit 77 causes the air conditioning system to cool and heat the inside of the vehicle cabin of the vehicle V, based on a set target temperature.

A functional unit that is controlled by the PW control unit 78 is a power window system of the vehicle V. Specifically, functional units that are controlled by the PW control unit 78 include actuators for opening and closing windows, and encoders for detecting positions of the windows.

Functional units that are controlled by the entry control unit 81 include a sensor 83 (FIG. 4) and a communication unit 84 (FIG. 4). The sensor 83 is disposed outside of the vehicle V or within the vehicle cabin, and detects an approach of a human to or contact of a human with the vehicle V. The communication unit 84 is a wireless communication device that performs wireless communication with an FOB key or any other electronic key of the vehicle V. The entry control unit 81, by using the sensor 83 and/or the communication unit 84, processes user access from the outside of the vehicle to the vehicle control system 1, and implements an operation for so-called smart entry.

The communication lines B1 to B4, B10, B20, B30 include a plurality of communication channels in conformity with various communication standards. The communication lines are referred to as communication lines B when not discriminated from each other. The communication lines B may be data channels in conformity with different communication standards. In other words, specific configurations, transmission bandwidths, and communication standards of cables used to configure the communication lines B are arbitrarily selected. Examples of applicable communication standards for the communication lines B include CAN, Ethernet®, USB (Universal Serial Bus), LIN (Local Interconnect Network), and LVDS (Low Voltage Differential Signaling), but any other standard may be used. Moreover, although each communication line B is presented as an independent communication line in FIGS. 1, 2, and 4, specific configurations of the communication lines B are not limited. For example, the communication lines B may have a bus configuration in which a communication line B is connected to a plurality of pieces of equipment, or a configuration in which a communication line B connects two pieces of equipment on a one-to-one basis.

The vehicle control system 1 has a cascade structure in which a plurality of ECUs is connected step by step. In other words, the vehicle control system 1 includes ECUs that are directly connected to the central ECU 2 through the communication lines B1, B2, and ECUs that are connected to the central ECU 2 via another ECU. Of the ECUs, the ECUs that are connected to the central ECU 2 via another ECU are referred to as vehicle control units. The vehicle control units are, specifically, the ECUs 50 connected to the zone A-ECU 11, and the ECUs 60 connected to the zone B-ECU 13.

In the example in FIG. 2, the FI control unit 51, the motor control unit 52, the BATT control unit 53, and the gearshift control unit 54 correspond to vehicle control units. Moreover, the light control unit 72, the electric door control unit 76, the A/C control unit 77, the PW control unit 78, and the entry control unit 81 correspond to vehicle control units. The communication line B20 connecting the zone A-ECU 11 and vehicle control units, and the communication line B30 connecting the zone B-ECU 13 and vehicle control units are referred to as lower-order communication lines.

The vehicle control units may also include an ECU that controls a functional unit of the vehicle V, among the ECUs directly connected to the central ECU 2. For example, the TCU 33, the IVI-ECU 35, and the driving assistance ECU 41 may be included among the vehicle control units.

Each of the zone A-ECU 11 and the zone B-ECU 13 is connected directly to the central ECU 2, and is disposed between vehicle control units and the central ECU 2. The zone A-ECU 11 and the zone B-ECU 13 perform adjustment and the like of communication between the vehicle control units and the central ECU 2. The zone A-ECU 11 and the zone B-ECU 13 correspond to examples of the higher-order control unit. The communications lines B1, B2 interconnecting the central ECU 2 and the zone A-ECU 11 and the zone B-ECU 13, which are higher-order control units, are referred to as higher-order communication lines. Of the higher-order control units, the central ECU 2 may be referred to as master control unit, and the zone A-ECU 11 and the zone B-ECU 13 may be referred to as intermediate control units. The higher-order control units, the intermediate control units, and the master control unit are ECUs that are connected to vehicle control units, and are in charge of transmission and processing of data related to control of the vehicle control units.

Each of the central ECU 2, the zone A-ECU 11, the zone B-ECU 13, and the other vehicle control units included in the vehicle control system 1 can change the own operation state between an ordinary operation state and a low electricity consumption state. The same holds true for various ECUs that are not depicted in FIG. 1.

The ordinary operation state of a vehicle control unit refers to a state of controlling a functional unit to be controlled by the vehicle control unit, and a state of being able to control the functional unit to be controlled. The ordinary operation state of the central ECU 2, the zone A-ECU 11, and the zone B-ECU 13 refers to a state of transmitting or receiving control data related to a vehicle control unit and processing the control data, and a state of being able to transmit or receive control data related to a vehicle control unit and process the control data. In contrast, the low electricity consumption state is a state in which electricity consumption is smaller than in the ordinary operation states, and is also referred to as sleep state.

The central ECU 2 in the low electricity consumption state, upon receiving a wake-up signal from any one of the communication lines B1 to B4 connected to the central ECU 2, starts up and transitions to the ordinary operation state. The wake-up signal may be, for example, digital data addressed to the central ECU 2 as a destination, or may be a fact that voltage of any one of the communication lines B1 to B4 becomes active. For example, each of the communication lines B1 to B4 is configured by using one signal line, or two differential signal lines, of the CAN or the CAN-FD. In such a case, the communication lines B1 to B4 are recessive in the low electricity consumption state of the central ECU 2, and when any one of the communication lines B1 to B4 falls in a dominant state, the central ECU 2 detects a wake-up signal and starts up. The wake-up signal may be a signal that selectively activates the central ECU 2.

Similarly, in the low electricity consumption state of the zone A-ECU 11, when any one of the communication lines B1, B20 connected to the zone A-ECU 11 becomes active, the zone A-ECU 11 detects a wake-up signal and starts up. In the low electricity consumption state of the zone B-ECU 13, when any one of the communication lines B2, B30 becomes active, the zone B-ECU 13 detects a wake-up signal and starts up.

Similarly, when each vehicle control unit detects a wake-up signal in the low electricity consumption state, the vehicle control unit starts up and transitions to the ordinary operation state. For example, each of the FI control unit 51, the motor control unit 52, the BATT control unit 53, and the gearshift control unit 54 detects a wake-up signal and starts up by a fact that voltage of the communication line B20 changes from being recessive to being dominant.

The wake-up signal that activates a vehicle control unit connected to the communication line B20 may be a signal that selectively activates any one of the FI control unit 51, the motor control unit 52, the BATT control unit 53, and the gearshift control unit 54. In such a case, the FI control unit 51, the motor control unit 52, the BATT control unit 53, and the gearshift control unit 54 can selectively transition to the low electricity consumption state. The same holds true for the light control unit 72, the electric door control unit 76, the A/C control unit 77, and the PW control unit 78 connected to the communication line B30.

In the vehicle control system 1, not all of the ECUs need to always stay in the ordinary operation states. For example, ECUs in a drive system, such as the FI control unit 51, the motor control unit 52, and the gearshift control unit 54, can be configured to be in the low electricity consumption state when the vehicle V is parked and the power supply of the vehicle V is turned off. On the other hand, the entry control unit 81 needs to perform communication with the FOB key when the driver intends to get in the vehicle V, and therefore needs to wait in the ordinary operation state or a similar operation state. Accordingly, the vehicle control system 1 causes each individual ECU or a predetermined number of ECUs as a unit, of the ECUs included in the vehicle control system 1, to transition to the low electricity consumption state. Thus, the amount of electricity consumed by the vehicle control system 1 can be restrained. Then, any ECU in the low electricity consumption state can start up by detecting a wake-up signal flowing through the communication lines B, and can transition to the ordinary operation state.

Each ECU corresponding to the central ECU 2, the zone A-ECU 11, the zone B-ECU 13, and the vehicle control units requires a predetermined time period after detecting a wake-up signal up until transitioning to the ordinary operation state. The time period is referred to as start-up time period. The length of the start-up time period varies depending on a type, functionality, specifications, and the like of each ECU.

As shown in FIG. 1, the central ECU 2 includes a processor 91A, a memory 93A, and communication units 96A, 97A.

The communication units 96A, 97A are communication circuits that has a transmitter and a receiver and transmit and receive a signal and data through the communication lines B1 to B4. The communication units 96A, 97A are configured by using, for example, NM-GW (Network Management GateWay). The communication units 96A, 97A may be mutually independent hardware pieces, or may be configured by using a single communication circuit.

The communication line B1 and the communication line B2 are connected to the communication unit 96A. The communication unit 96A performs communication with the zone A-ECU 11 and the zone B-ECU 13. The communication lines B3, B4 are connected to the communication unit 97A. The communication unit 97A performs communication with each ECU connected to the communication lines B3, B4.

The communication unit 96A receives signals transmitted through the communication line B1 and the communication line B2. The communication unit 96A makes notification to the processor 91A when a wake-up signal from the communication line B1 or the communication line B2 is detected while the central ECU 2 is in the low electricity consumption state. The communication unit 96A includes a function of transmitting wake-up signals through the communication line B1 and the communication line B2, according to control by the processor 91A.

The communication unit 96A selects any one, or both, of the communication line B1 and the communication line B2 and transmits a wake-up signal. In such a case, the communication unit 96A transmits the wake-up signal at regular intervals until equipment on the other side of communication completes starting up and transitions to the ordinary operation state. A transmission period of the wake-up signal is a predetermined period, which is preset. The predetermined transmission period corresponds to an example of a second transmission period in the present disclosure. The wake-up signal transmitted by the communication unit 96A corresponds to an example of a second wake-up signal.

The transmission period in which the communication unit 96A transmits the wake-up signal can be varied through control by the processor 91A. For example, the processor 91A determines the period in which the communication unit 96A transmits the wake-up signal. The communication unit 96A repeatedly transmits the wake-up signal at intervals of the transmission period specified by the processor 91A. In such a case, the period specified by the processor 91A corresponds to an example of a first transmission period in the present disclosure.

The communication unit 96A includes a function of transmitting and receiving control data through the communication line B1 or the communication line B2. The control data is data related to control of a vehicle control unit. For example, the communication unit 96A transmits to or receives from the zone A-ECU 11 control data related to a function for the BATT control unit 53 to control the travel battery. The control data is transmitted or received, for example, in the form of a data frame of the CAN or the CAN-FD. When transmitting control data through the communication line B1 or the communication line B2, the communication unit 96A performs transmission at intervals of a transmission period for control data. The transmission period for control data is a period preset by the communication unit 96A or a period specified by the processor 91A, and is not a variable period. The transmission period for control data corresponds to an example of a fourth transmission period in the present disclosure.

The communication unit 97A receives signals transmitted through the communication lines B3, B4. The communication unit 97A makes notification to the processor 91A when a wake-up signal from any one of the communication lines B3, B4 is detected while the central ECU 2 is in the low electricity consumption state. The communication unit 97A includes a function of transmitting wake-up signals through the communication lines B3, B4, according to control by the processor 91A.

The communication unit 97A selects one or more of the communication lines B3, B4 and transmits a wake-up signal. In such a case, the communication unit 97A transmits the wake-up signal at regular intervals until equipment on the other side of communication completes starting up and transitions to the ordinary operation state. A transmission period of the wake-up signal is a predetermined period, which is preset.

The communication unit 97A includes a function of transmitting and receiving control data through the communication lines B3, B4. The control data is transmitted or received, for example, in the form of a data frame of the CAN or the CAN-FD. When transmitting control data through the communication lines B3, B4, the communication unit 97A performs transmission at intervals of a transmission period for control data. The transmission period for control data is a period preset by the communication unit 97A or a period specified by the processor 91A, and is not a variable period. The transmission period for control data corresponds to an example of the fourth transmission period in the present disclosure.

The processor 91A is configured by using, for example, a CPU (Central Processing Unit), an MCU (Micro Controller Unit), or an MPU (Micro Processor Unit). The memory 93A is a rewritable non-transitory storage device, and stores a program to be executed by the processor 91 and data to be processed by the processor 91. The memory 93 is configured by using, for example, a semiconductor storage device such as flash ROM (Read Only Memory) or SSD (Solid State Disk), or a magnetic storage device. The memory 93A may include a RAM (Random Access Memory) in which a work area for temporarily storing the program and the data is formed. The processor 91A and the memory 93A may be configured by using an integrated circuit (IC) in a single unit. The central ECU 2 may be an integrated circuit in which the processor 91A, the memory 93A, and the communication units 96A, 97A are integrated, or may have a configuration including the processor 91A, the memory 93A, and the communication units 96A, 97A as independent hardware pieces.

The memory 93A stores start-up time period data 94A and identification data 95A.

The start-up time period data 94A is data indicating a start-up time period of an ECU connected to the central ECU 2 through a higher-order communication line. In the examples in FIGS. 1 and 2, the ECUs connected to the central ECU 2 through the higher-order communication lines are the zone A-ECU 11 and the zone B-ECU 13. Accordingly, the start-up time period data 94A includes a start-up time period of the zone A-ECU 11 and a start-up time period of the zone B-ECU 13.

The start-up time period data 94A may be data in which the start-up time period of the zone A-ECU 11 is described beforehand. In such a case, the start-up time period of the zone A-ECU 11 included in the start-up time period data 94A is a time period acquired based on design or through measurement. The processor 91A may update the start-up time period data 94A by measuring a time period actually taken by the zone A-ECU 11 to start up. In such a case, the start-up time period data 94A indicates a measurement value of the most recent start-up time period, or of the start-up time period measured when the zone A-ECU 11 last started up from the low electricity consumption state. The start-up time period of the zone B-ECU 13 included in the start-up time period data 94A is similar to the start-up time period of the zone A-ECU 11.

The identification data 95A indicates functions that take actions with respect to signals and data received by the central ECU 2, and destinations to which the signals and the data are transferred. When a signal or data is received by the communication unit 96A or the communication unit 97A, the processor 91A refers to the identification data 95A and identifies an ECU and a function related to the received signal or data.

The processor 91A causes the central ECU 2 to transition from the ordinary operation state to the low electricity consumption state, according to an operating state of the vehicle V. When a wake-up signal is received by the communication unit 96A or the communication unit 97A in the low electricity consumption state, the processor 91A starts up and makes a transition to the ordinary operation state.

When a signal or data is received by the communication unit 96A or the communication unit 97A, the processor 91A refers to the identification data 95A and identifies a function and an ECU related to the received signal or data. Such signals include a wake-up signal. The processor 91A performs processing based on the received signal or data and, based on a result of the processing, transmits the signal or the data by using the communication unit 96A or the communication unit 97A.

The processor 91A determines a transmission period of a wake-up signal when another ECU connected through a higher-order communication line needs to be woken up. In the present embodiment, such operation is performed when the zone A-ECU 11 or the zone B-ECU 13 is to be woken up.

The processor 91A can selectively perform an ordinary start-up function and a high-speed start-up function. The ordinary start-up function is a function of transmitting a wake-up signal at intervals of the predetermined transmission period. The predetermined transmission period is preset by the processor 91A or the communication unit 96A, and is not changed by the processor 91A. When performing the ordinary start-up function, the processor 91A instructs the communication unit 96A to transmit a wake-up signal, and specifies the predetermined transmission period.

The high-speed start-up function is a function of determining a transmission period of a wake-up signal according to a start-up time period of an ECU to be woken up, and causing a wake-up signal to be transmitted at intervals of the determined transmission period. When performing the high-speed start-up function, the processor 91A refers to the start-up time period data 94A and determines the transmission period in such a manner that the start-up time period of the ECU to be woken up becomes a multiple of the transmission period, or a multiple of a period obtained by adding a margin to the transmission period. The transmission period may be longer, or shorter, than the above-mentioned predetermined transmission period. The processor 91A indicates the period determined based on the start-up time period data 94A to the communication unit 96A, and instructs the communication unit 96A to transmit a wake-up signal.

The zone A-ECU 11 includes a processor 91B, a memory 93B, a communication unit 96B, and a communication unit 97B. Functions and configurations of the processor 91B, the memory 93B, the communication unit 96B, and the communication unit 97B are similar to those of the processor 91A, the memory 93A, the communication unit 96A, and the communication unit 97A, respectively.

The communication unit 96B is connected to the communication line B1, and performs communication with the central ECU 2.

The communication line B20 is connected to the communication unit 97B. The communication unit 97B performs communication with the ECUs 50 through the communication line B20.

The zone B-ECU 13 includes a processor 91C, a memory 93C, a communication unit 96C, and a communication unit 97C. Functions and configurations of the processor 91C, the memory 93C, the communication unit 96C, and the communication unit 97C are similar to those of the processor 91A, the memory 93A, the communication unit 96A, and the communication unit 97A, respectively.

The communication unit 96C is connected to the communication line B2, and performs communication with the central ECU 2.

The communication line B30 is connected to the communication unit 97C. The communication unit 97C performs communication with the ECUs 60 through the communication line B30.

The memory 93B stores start-up time period data 94B and identification data 95B. The start-up time period data 94B is data indicating a start-up time period of an ECU connected to the zone A-ECU 11 through a higher-order communication line. In the examples in FIGS. 1 and 2, the ECU connected to the zone A-ECU 11 through the higher-order communication line is the central ECU 2. Accordingly, the start-up time period data 94B includes a start-up time period of the central ECU 2.

The memory 93C stores start-up time period data 94C and identification data 95C. The start-up time period data 94C is data indicating a start-up time period of an ECU connected to the zone B-ECU 13 through a higher-order communication line. In the examples in FIGS. 1 and 2, the ECU connected to the zone B-ECU 13 through the higher-order communication line is the central ECU 2. Accordingly, the start-up time period data 94C includes the start-up time period of the central ECU 2.

The start-up time period data 94B, 94C may be data in which the start-up time period of the central ECU 2 is described beforehand. In such a case, the start-up time period of the central ECU 2 included in the start-up time period data 94B, 94C is a time period acquired based on design or through measurement.

The processor 91B may update the start-up time period data 94B by measuring a time period actually taken by the central ECU 2 to start up. In such a case, the start-up time period data 94B indicates a measurement value of the most recent start-up time period, or of the start-up time period measured when the central ECU 2 last started up from the low electricity consumption state. Similarly, the start-up time period data 94C may be a time period measured by the processor 91C.

Hereinafter, the processors 91A, 91B, 91C are referred to as processors 91 when not discriminated from each other. Similarly, the memories 93A, 93B, 93C are referred to as memories 93 when not discriminated from each other. The same applies to the start-up time period data 94A, 94B, 94C, and to the identification data 95A, 95B, 95C. Moreover, the communication units 96A, 96B, 96C and the communication units 97A, 97B, 97C are also referred to as communication units 96 and communication units 97, respectively, when not discriminated from each other.

In the vehicle control system 1, each ECU other than the central ECU 2, the zone A-ECU 11, and the zone B-ECU 13, includes components that are, though not depicted, similar to the processors 91, the memories 93, the communication units 96, and the communication units 97.

Figure 3:
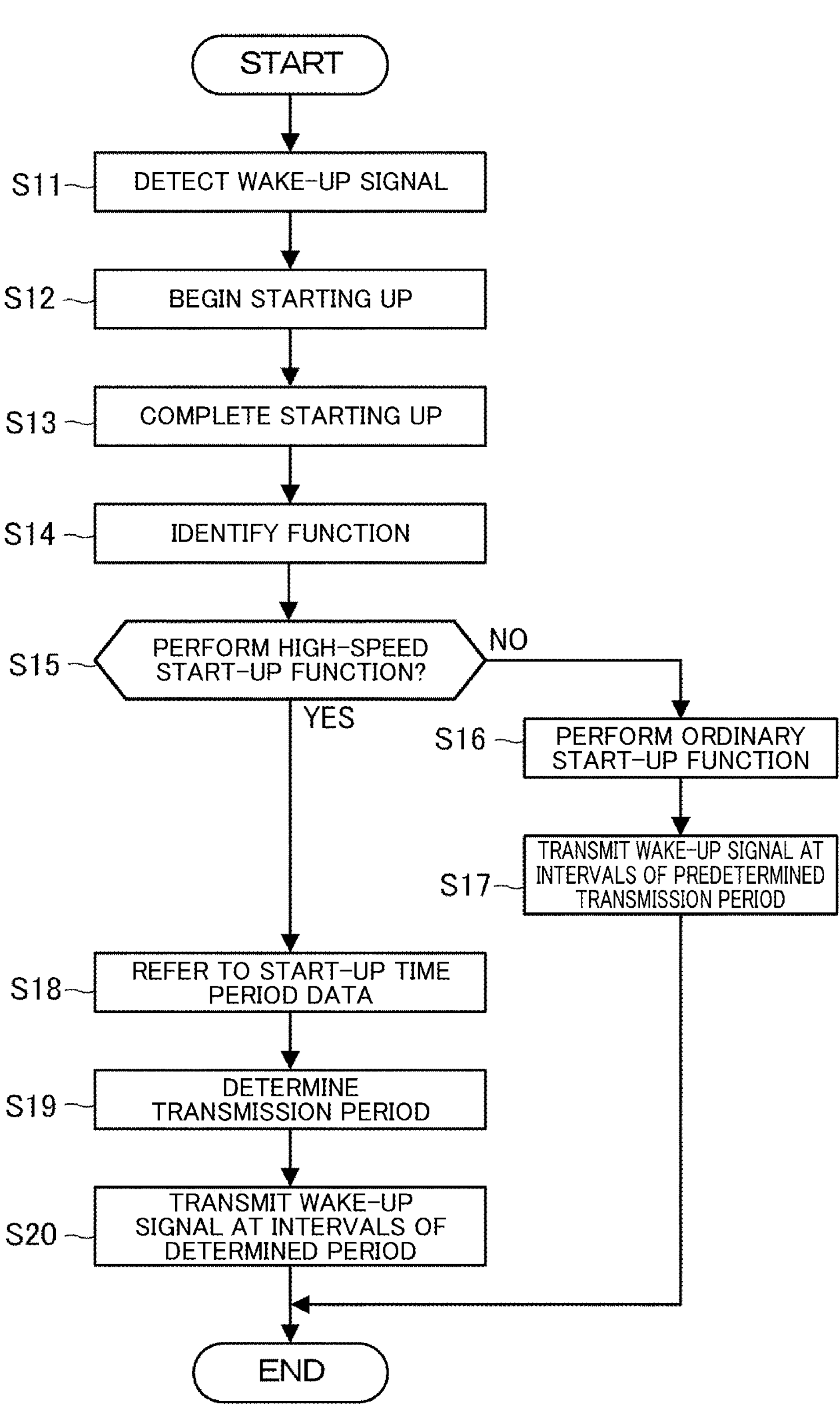
FIG. 3 is a flowchart showing operation of the vehicle control system.

FIG. 3 is a flowchart showing operation of the vehicle control system 1, and shows operation of the ECUs connected to the higher-order communication lines. Specifically, shown is the operation performed by the central ECU 2, the zone A-ECU 11, and the zone B-ECU 13 in the configurations shown in FIGS. 1 and 2. In other words, each of the processors 91A, 91B, 91C can perform the operation in FIG. 3. Here, a description is given by taking the operation of the processor 91B as an example.

In the low electricity consumption state, when a wake-up signal is detected by the communication unit 97B (step S11), the processor 91B begins starting up (step S12). When start-up processing is completed and a transition is made to the ordinary start-up function (step S13), the processor 91B identifies a function of the vehicle V related to the wake-up signal detected by the communication unit 97B (step S14).

In step S14, for example, the processor 91B identifies the function related to the wake-up signal by identifying an ECU that is a source of the wake-up signal. Alternatively, the processor 91B identifies the function related to the wake-up signal, based on data, an identification sign, or the like added to the wake-up signal.

Based on what function the function identified in step S14 is, the processor 91B determines whether or not to perform the high-speed start-up function (step S15). When the processor 91B determines not to perform the high-speed start-up function (step S15; NO), the processor 91B performs the ordinary start-up function (step S16), and causes the communication unit 96B to transmit a wake-up signal at intervals of the predetermined transmission period (step S17).

When the processor 91B determines to perform the high-speed start-up function (step S15; YES), the processor 91B performs the high-speed start-up function. In other words, the processor 91B refers to the start-up time period data 94B (step S18), and determines a transmission period corresponding to the start-up time period (step S19). The processor 91B causes the communication unit 96B to transmit a wake-up signal at intervals of the transmission period determined in step S19 (step S20).

The high-speed start-up function can shorten a time period for an ECU to reach a transmission period after completing starting up, by adapting the transmission period of a wake-up signal to the start-up time period of the ECU. Accordingly, an advantage is brought about that even if an ECU is in the low electricity consumption state, processing including starting up of the ECU can be performed in a short time. Accordingly, it is preferable that the high-speed start-up function be performed for a function, among the functions of the vehicle V, for which a shorter response time period is particularly effective.

A function for which the processors 91A, 91B, 91C perform the high-speed start-up function is a function that is required to quickly respond to an operation or the like made by the driver or a passenger. For example, following first to fifth functions can be mentioned.

The first function is a function of unlocking a door lock of the vehicle V in response to an event that the driver or a passenger approaches the vehicle V or makes an operation or the like to a door of the vehicle V. When the function is performed, in the vehicle control system 1, the entry control unit 81 detects an approach of the FOB key or a switch operation of the FOB key, then the zone B-ECU 13, the central ECU 2, and the electric door control unit 76 start up, and then an actuator performs unlocking through control by the electric door control unit 76.

The second function is a function of bringing the transmission system 57 into an operable state, following an event that the driver or a passenger approaches the vehicle V or makes an operation or the like to a door of the vehicle V. In the vehicle control system 1, the entry control unit 81 detects an approach of the FOB key or a switch operation of the FOB key, and the zone B-ECU 13, the central ECU 2, the zone A-ECU 11, and the gearshift control unit 54 start up.

The third function is a function of lighting up a lighting device installed outside of the vehicle V or inside of the vehicle cabin, in response to an event that the driver or a passenger approaches the vehicle V or makes an operation or the like to a door of the vehicle V. A light called welcome lamp applies to the lighting device. When the function is performed, in the vehicle control system 1, the entry control unit 81 detects an approach of the FOB key or a switch operation of the FOB key, then the zone B-ECU 13, the central ECU 2, and the light control unit 72 start up, and then the welcome lamp is lit up for a predetermined time period through control by the light control unit 72.

The fourth function is a function of flashing hazard lights of the vehicle V in response to an event that the driver operates a switch of the FOB key. When the function is performed, in the vehicle control system 1, the entry control unit 81 detects a switch operation of the FOB key, then the zone B-ECU 13, the central ECU 2, and the light control unit 72 start up, and then the hazard lights in the lighting system 82 are flashed through control by the light control unit 72.

The fourth function is a function of unlocking a door lock of the vehicle V when a pre-registered face of the driver or a passenger is recognized by using the camera 44. When the function is performed, in the vehicle control system 1, the central ECU 2 recognizes the pre-registered face of the driver or a passenger, based on an image captured by the camera 44, then the central ECU 2, the zone B-ECU 13, and the electric door control unit 76 start up, and then an actuator performs unlocking through control by the electric door control unit 76.

The fifth function is a function of lighting up the welcome lamp when the pre-registered face of the driver or a passenger is recognized by using the camera 44. When the function is performed, in the vehicle control system 1, the central ECU 2 recognizes the pre-registered face of the driver or a passenger, based on an image captured by the camera 44, then the central ECU 2, the zone B-ECU 13, and the light control unit 72 start up, and then the welcome lamp is lit up for a predetermined time period through control by the light control unit 72.

A function for which the processors 91A, 91B, 91C perform the ordinary start-up function is a function that poses no problem even if taking several hundred milliseconds to several seconds to respond to an operation or the like made by the driver or a passenger. For example, the function is a function related to an event that the driver or a passenger makes an operation or the like at a position away from the vehicle V. As specific examples, the following sixth to eleventh functions can be mentioned.

The sixth function is a function related to an event that the driver or a passenger operates a smartphone or any other communication terminal and transmits a command to the vehicle V from the communication terminal via a communication network, a server, and the like, which are not depicted. More specifically, the function is for the vehicle V to light up or flash the lighting system 82 in response to the command from the communication terminal. The function is part of a function called car finder. When the function is performed, in the vehicle control system 1, the TCU 33 receives the command, then the central ECU 2, the zone B-ECU 13, and the light control unit 72 start up, and then the lighting system 82 is lit up or flashed through control by the light control unit 72.

The seventh function is a function for the vehicle V to receive a command from a communication terminal similarly to the sixth function, and to honk a horn of the vehicle V in response to the command. The function is part of the function called car finder. When the function is performed, in the vehicle control system 1, the TCU 33 receives the command, then the central ECU 2, the zone B-ECU 13, and an undepicted horn control unit start up, and then the horn is honked through control by the horn control unit.

The eighth function is a function for the vehicle V to receive a command from a communication terminal similarly to the sixth function, and to transmit position information on the vehicle V or map data on an area including a position of the vehicle V to a terminal device in response to the command. The function is part of the function called car finder. When the function is performed, in the vehicle control system 1, the TCU 33 receives the command, then the central ECU 2 and the IVI-ECU 35 start up, and then the position information on the vehicle V detected by the IVI-ECU 35 or the map data held by the IVI-ECU 35 is transmitted to the terminal device by the TCU 33.

The ninth function is a function for the vehicle V to receive a command from a communication terminal similarly to the sixth function, and to transmit an image captured by the camera 44 to a terminal device in response to the command. When the function is performed, in the vehicle control system 1, the TCU 33 receives the command, then the central ECU 2 starts up, then the central ECU 2 acquires the image captured by the camera 44, and then the image captured by the camera 44 is transmitted to the terminal device by the TCU 33 in response to the command.

The tenth function is a function of starting to charge the travel battery on a preset date and time based on a timer prearrangement function of the vehicle V. The timer prearrangement function is implemented, for example, by an RTC (Real Time Clock) built in the IVI-ECU 35 measuring time for a date and time designated through an operation of the touch panel. When the function is performed, in the vehicle control system 1, the IVI-ECU 35 detects that the date and time prearranged on a timer is reached, then the central ECU 2, the zone A-ECU 11, and the BATT control unit 53 start up, and then charging of the travel battery is started through control by the BATT control unit 53.

The eleventh function is a function of starting or stopping the air conditioning system running on a preset date and time, based on the timer prearrangement function of the vehicle V. When the function is performed, in the vehicle control system 1, the IVI-ECU 35 detects that the date and time prearranged on the timer is reached, then the central ECU 2, the zone B-ECU 13, and the A/C control unit 77 start up, and then the air conditioning system starts or stops running for air conditioning, through control by the A/C control unit 77.

The above-described first to eleventh functions are only examples of the functions included in the vehicle V. For the other functions of the vehicle V, the processors 91 can select and perform one of the high-speed start-up function and the ordinary start-up function, depending on a function.

FIG. 4 is a schematic diagram showing an example of the operation of the vehicle control system 1. In FIG. 4, start-up order in which the ECUs in the vehicle control system 1 start up is indicated by arrows. The start-up order P1 and the start-up order P2 shown in FIG. 4 indicate order related to the above-described second function, and order related to the above-described sixth function, respectively.

As indicated by the start-up order P1, when the second function is performed, the entry control unit 81, triggered by the sensor 83 or the communication unit 84 performing detection, wakes up the zone B-ECU 13. Subsequently, the zone B-ECU 13 wakes up the central ECU 2, and the central ECU 2 then wakes up the zone A-ECU 11. The zone A-ECU 11 wakes up the gearshift control unit 54, whereby the gearshift control unit 54 becomes able to control the transmission system 57.

The start-up order P1 shows an example of functions for which the high-speed start-up function is performed.

As indicated by the start-up order P2, when the sixth function is performed, the central ECU 2 starts up, which is triggered by the TCU 33 receiving a command, and the central ECU 2 wakes up the zone B-ECU 13. The zone B-ECU 13 wakes up the light control unit 72, whereby the light control unit 72 lights up or flashes the lighting system 82.

The start-up order P2 shows an example of functions for which the ordinary start-up function is performed.

Figure 5:
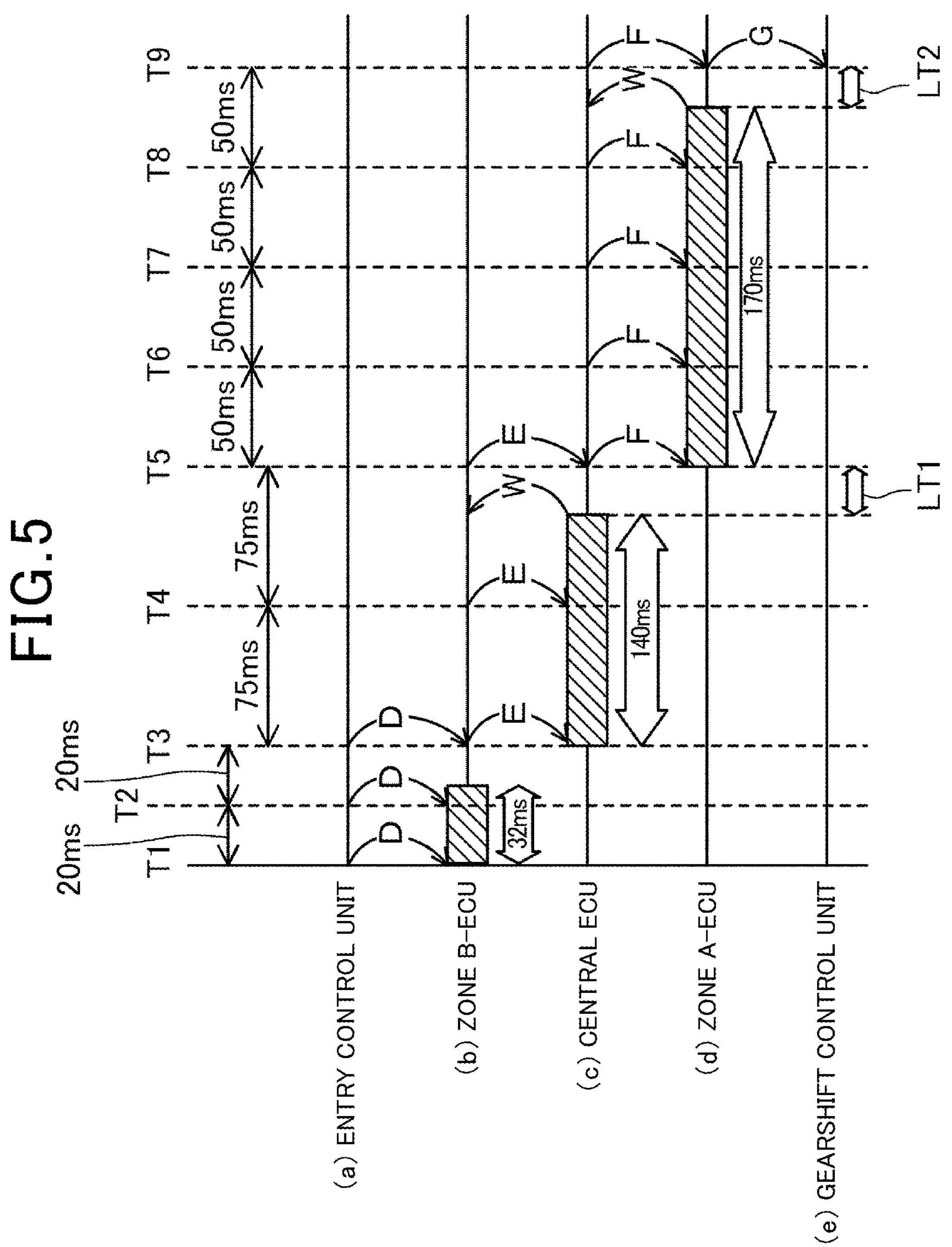
FIG. 5 is a timing chart showing an example of the operation of the vehicle control system.

FIG. 5 is a timing chart showing an example of the operation of the vehicle control system 1, and shows an example of the high-speed start-up function corresponding to the start-up order P1 in FIG. 4.

In FIG. 5, (a) shows operation of the entry control unit 81, (b) shows operation of the zone B-ECU 13, and (c) shows operation of the central ECU 2. Moreover, (d) shows operation of the zone A-ECU 11, and (e) shows operation of the gearshift control unit 54. Note that regarding FIGS. 5 and 6, depiction and description of transmission delays in the vehicle control system 1 and processing delays within the ECUs are omitted, for convenience of understanding.

The entry control unit 81 starts up in response to detection by the sensor 83 or the communication unit 84, and starts transmitting a wake-up signal D to the communication line B20. Transmission of the wake-up signal D is repeated, for example, at intervals of 20 milliseconds from time Tl. The transmission period in which the entry control unit 81 transmits the wake-up signal D is a predetermined period. The transmission period of the wake-up signal D corresponds to an example of a third transmission period in the present disclosure. The wake-up signal D corresponds to an example of a first wake-up signal in the present disclosure.

The zone B-ECU 13 starts up by detecting the wake-up signal D at time Tl. The start-up time period of the zone B-ECU 13 is 32 milliseconds in the example in FIG. 5. The zone B-ECU 13 detects the wake-up signal D at time T3, which comes after the zone B-ECU 13 has completed starting up, and transmits a wake-up signal E to the central ECU 2 in response to the wake-up signal D detected at time T3. The wake-up signal E corresponds to an example of the second wake-up signal in the present disclosure.

Based on the wake-up signal D received at time T3 after starting up, the zone B-ECU 13 selects any one of the high-speed start-up function and the ordinary start-up function. In the example in FIG. 5, the high-speed start-up function is selected. The zone B-ECU 13 determines a transmission period of the wake-up signal E, according to a start-up time period of the central ECU 2 indicated by the start-up time period data 94C. For example, in the example in FIG. 5, the start-up time period of the central ECU 2 is 140 milliseconds. In such a case, when the transmission period of the wake-up signal E is set to 70 milliseconds or 140 milliseconds, the wake-up signal E is received by the central ECU 2 immediately after the central ECU 2 has started up. Since the transmission period of the wake-up signal E has an upper limit due to specifications of the ECUs and the communications line B, the transmission period of the wake-up signal E is 70 milliseconds in the example of FIG. 5. Moreover, to enhance certainty of the operation, it is desirable that a transmission period include a certain margin. The zone B-ECU 13 therefore determines that the transmission period of the wake-up signal E is 75 milliseconds. In such a case, the central ECU 2 detects the wake-up signal E at time T5, which is 10 milliseconds after the central ECU 2 has completed starting up, and transmits a wake-up signal F to the zone A-ECU 11. A time period after the central ECU 2 has completed starting up until the central ECU 2 detects the wake-up signal E is loss of time during which processing is substantially not performed. By performing the high-speed start-up function, a waiting time period LT1 related to start-up of the central ECU 2 can be restricted to 10 milliseconds.

Based on the wake-up signal E received at time T5 after starting up, the central ECU 2 selects any one of the high-speed start-up function and the ordinary start-up function. In the example in FIG. 5, the high-speed start-up function is selected. The central ECU 2 determines a transmission period of the wake-up signal F, according to a start-up time period of the zone A-ECU 11 indicated by the start-up time period data 94A.

In the example in FIG. 5, the start-up time period of the zone A-ECU 11 is 170 milliseconds. In such a case, a waiting time period can be shortened when the transmission period of the wake-up signal F is set to 45 milliseconds, 85 millisecond, or 170 milliseconds. The central ECU 2 determines that the transmission period is 50 milliseconds, in order to adapt the transmission period to an upper limit thereof and to a margin constraint. In such a case, the zone A-ECU 11 detects the wake-up signal F at time T9, which is 30 milliseconds after the zone A-ECU 11 has completed starting up, and transmits a wake-up signal G to the gearshift control unit 54. A waiting time period LT2 after the zone A-ECU 11 has completed starting up until the zone A-ECU 11 detects the wake-up signal F is 30 milliseconds, which is sufficiently short, compared to the start-up time period of the zone A-ECU 11.

In the example in FIG. 5, when the central ECU 2 has completed starting up, the central ECU 2 may transmit a notification signal W indicating start-up completion to the zone B-ECU 13. In such a case, the zone B-ECU 13 may detect the start-up time period of the central ECU 2, based on the notification signal W, and may update the start-up time period data 94C. Similarly, when the zone A-ECU 11 has completed starting up, the zone A-ECU 11 may transmit a notification signal W to the central ECU 2, in which case the central ECU 2 may update the start-up time period data 94A, based on the notification signal W.

FIG. 6 is a timing chart showing an example of the operation of the vehicle control system 1, and shows an example of the ordinary start-up function corresponding to the start-up order P2 in FIG. 4.

In FIG. 6, (a) shows operation of the TCU 33, (b) shows operation of the central ECU 2, (c) shows operation of the zone B-ECU 13, and (d) shows operation of the light control unit 72.

The TCU 33 starts transmitting a wake-up signal H through the communication line B3 after receiving a command via the communication function. Transmission of the wake-up signal H is repeated, for example, at intervals of 100 milliseconds from time T11. The transmission period in which the TCU 33 transmits the wake-up signal H is a predetermined period, and is a fixed period determined according to specifications of the TCU 33 and the communication line B3. The transmission period corresponds to an example of the third transmission period in the present disclosure. The wake-up signal H corresponds to an example of the first wake-up signal in the present disclosure.

The central ECU 2 begins starting up by detecting the wake-up signal H at time T11. In the example in FIG. 6, the start-up time period of the central ECU 2 is 140 milliseconds. The central ECU 2 detects the wake-up signal H at time T13, which comes after the central ECU 2 has completed starting up, and transmits a wake-up signal I to the zone B-ECU 13 in response to the wake-up signal H detected at time T13. The wake-up signal I corresponds to an example of the second wake-up signal in the present disclosure.

In the example in FIG. 6, the central ECU 2 selects the ordinary start-up function. The central ECU 2 uses 80 milliseconds, which is a predetermined transmission period, for the transmission period of the wake-up signal I. The central ECU 2 transmits the wake-up signal I at intervals of 80 milliseconds.

The zone B-ECU 13 begins starting up when detecting the wake-up signal I at time T13, and completes starting up after 170 milliseconds. The zone B-ECU 13 starts transmitting a wake-up signal J to the light control unit 72 in response to detecting the wake-up signal I at time T16.

In the example in FIG. 6, a waiting time period LT3 after the central ECU 2 has started up until the central ECU 2 detects the wake-up signal H is 60 milliseconds. A waiting time period LT4 after the zone B-ECU 13 has started up until the zone B-ECU 13 detects the wake-up signal I is 70 milliseconds. The waiting time periods are longer than the examples in FIG. 5.

In the vehicle control system 1, the zone A-ECU 11, the zone B-ECU 13, and the central ECU 2 perform the high-speed start-up function, for functions that are required to quickly respond to an operation made by the driver or a passenger. By performing the high-speed start-up function, the waiting time period can be shortened, and a quick response can be achieved. By shortening the waiting time period to wake up an ECU from the low electricity consumption state, driver and passenger convenience is not impaired even if the ECU is allowed to transition to the low electricity consumption state. Accordingly, it is possible to proactively cause ECUs to transition to the low electricity consumption state, so that the amount of electricity consumed by the vehicle control system 1 can be effectively restrained. Moreover, in the vehicle control system 1, the zone A-ECU 11, the zone B-ECU 13, and the central ECU 2 perform the ordinary start-up function, for functions for which a little delay is allowed. Thus, it is possible to reduce processing loads on the central ECU 2, the zone A-ECU 11, and the zone B-ECU 13, and transmission loads on the communication lines B, and operation stability can be ensured.

Moreover, the ECUs that are vehicle control units, other than the central ECU 2, the zone A-ECU 11, and the zone B-ECU 13, transmit a wake-up signal at intervals of the predetermined transmission period. The predetermined transmission period is determined according to the specifications of each ECU and each communication line B, and is not changed. Such ECUs are connected to the communication lines B, which are buses shared by a plurality of ECUs. Accordingly, by not changing the transmission periods, bus communications can be stabilized, and reliability can be ensured.

In the example in FIG. 6, when the zone B-ECU 13 has completed starting up, the zone B-ECU 13 may transmit a notification signal W to the central ECU 2. The central ECU 2 may detect the start-up time period of the zone B-ECU 13, based on the notification signal W, and may update the start-up time period data 94A.

The above-described embodiment shows a specific example to which the present invention is applied, and is not intended to limit embodiments to which the invention is applied.

Although a configuration is described in the above-described embodiment in which the central ECU 2, the zone A-ECU 11, and the zone B-ECU 13 are capable of selectively performing the high-speed start-up function and the ordinary start-up function, such a configuration is an example. For example, the central ECU 2 may be configured to perform only the ordinary start-up function. Moreover, an ECU that does not share a bus with another ECU may be configured to be capable of selectively performing the high-speed start-up function and the ordinary start-up function.

The configuration of the vehicle control system 1 shown in the above-described embodiment is an example, and types of the ECUs and the number of the ECUs included in the vehicle control system 1, and configurations of devices that are controlled by the ECUs can be variously changed. Step units shown in FIG. 3 are resultants of division according to main processing contents, in order to facilitate understanding of the operations in the vehicle control system 1, and are not limited by a way of division and names of processing units. Division can be made into more step units, depending on processing contents. Division can be made in such a manner that one step unit include more processing. Order of the steps may be interchanged as appropriate.

Moreover, matters described in the present embodiment can be combined as appropriate. For example, any one of configurations 1 to 7 described below can be combined with any other configuration.

The above-described embodiment supports the following configurations.

(Configuration 1) An electronic communication system including: a vehicle control unit that controls a functional unit mounted in a vehicle; and a higher-order control unit, wherein the vehicle control unit and the higher-order control unit are connected through a lower-order communication line, and a plurality of the higher-order control units are connected to each other through a higher-order communication line, and the higher-order control unit starts up from a sleep state in response to receiving a first wake-up signal from the vehicle control unit through the lower-order communication line, determines a first transmission period, based on a time period required for another one of the higher-order control units to start up, the another higher-order control unit being connected to the higher-order control unit through the higher-order communication line, and transmits a second wake-up signal to the another higher-order control unit at regular intervals of the determined first transmission period.

According to the electronic communication system of configuration 1, responsiveness can be enhanced when the higher-order control unit is woken up, with the electronic communication system including the control units mounted in the vehicle. Thus, the higher-order control unit can be placed into sleep without responsiveness of the higher-order control unit being impaired. Accordingly, energy efficiency improvement in the electronic communication system in the vehicle can be achieved by appropriately placing the control units mounted in the vehicle into sleep.

(Configuration 2) The electronic communication system according to configuration 1, wherein the higher-order control unit: switches between and performs one of an ordinary start-up function and a high-speed start-up function, depending on a function that is a cause for the vehicle control unit to transmit the first wake-up signal; when performing the ordinary start-up function, transmits the second wake-up signal at intervals of a predetermined second transmission period; and when performing the high-speed start-up function, determines the first transmission period that is different from the second transmission period, based on the time period required for the another higher-order control unit to start up.

According to the electronic communication system of configuration 2, the high-speed start-up function that determines the transmission period of the wake-up signal based on the time period required for the higher-order control unit to start up, and the ordinary start-up function that transmits the wake-up signal at intervals of the predetermined transmission period can be selectively performed. Accordingly, for a function required to quickly respond, responsiveness can be enhanced by using the high-speed start-up function. Moreover, for other functions, the ordinary start-up function is used, whereby processing loads on the higher-order control units and transmission loads on the communication lines can be reduced, so that operation stability can be enhanced. Accordingly, both operation stability and response quickness can be achieved.

(Configuration 3) The electronic communication system according to configuration 1 or 2, wherein the higher-order control unit determines the first transmission period, based on the time period that was required for the another higher-order control unit to start up in past.

According to the electronic communication system of configuration 3, the transmission period of the wake-up signal can be determined based on the time period that was actually required for the higher-order control unit to start up. Thus, an appropriate transmission period can be determined according to a state of the higher-order control unit.

(Configuration 4) The electronic communication system according to any one of configurations 1 to 3, wherein the higher-order control unit determines the first transmission period in such a manner that the time period that was required for the another higher-order control unit to start up in past is a multiple of the first transmission period.

According to the electronic communication system of configuration 4, by setting the transmission period adapted to the time period required for the higher-order control unit to start up, a waiting time period after the higher-order control unit has started up until the higher-order control unit performs processing corresponding to the wake-up signal can be effectively shortened. Accordingly, when the higher-order control unit is in the low electricity consumption state, responsiveness can be further enhanced.

(Configuration 5) The electronic communication system according to any one of configurations 1 to 4, wherein the vehicle control unit transmits the first wake-up signal at intervals of a predetermined third transmission period, and the higher-order control unit is capable of transmitting the second wake-up signal at intervals of the first transmission period that is variable, and transmits the second wake-up signal after performing operation of determining the first transmission period.

According to the electronic communication system of configuration 5, enhancement of responsiveness can be achieved by allowing the higher-order control unit to vary the transmission period of the wake-up signal. Moreover, since the vehicle control unit transmits the wake-up signal at intervals of the predetermined transmission period, for example, a configuration is possible in which a plurality of the vehicle control units shares the lower-order communication line. Accordingly, both responsiveness enhancement and an efficient configuration of the communication line in the electronic communication system can be achieved.

(Configuration 6) The electronic communication system according to any one of configurations 1 to 5, wherein the higher-order control unit transmits a data frame including control data on the vehicle control unit at intervals of a predetermined fourth transmission period, and transmits the second wake-up signal at intervals of the first transmission period.

According to the electronic communication system of configuration 6, the transmission period of the wake-up signal is variable, and the data frames that account for much of traffic in the communication line are transmitted at intervals of the fixed transmission period. Thus, responsiveness at a time of starting up from the low electricity consumption state can be enhanced, and at the same time, communication stability can be achieved.

(Configuration 7) A signal transmission method in an electronic communication system in which a vehicle control unit and a higher-order control unit are connected through a lower-order communication line, and a plurality of the higher-order control units are connected to each other through a higher-order communication line, the vehicle control unit controlling a functional unit mounted in a vehicle, the signal transmission method including: causing the higher-order control unit to start up from a sleep state by the vehicle control unit transmitting a first wake-up signal to the higher-order control unit through the lower-order communication line; and by the higher-order control unit, determining a first transmission period, based on a time period required for another one of the higher-order control units to start up, the another higher-order control unit being connected to the higher-order control unit through the higher-order communication line, and transmitting a second wake-up signal to the another higher-order control unit at regular intervals of the determined first transmission period.

According to the signal transmission method of configuration 7, responsiveness can be enhanced when the higher-order control unit mounted in the vehicle is woken up. Thus, the higher-order control unit can be placed into sleep without responsiveness of the higher-order control unit being impaired. Accordingly, energy efficiency improvement in the electronic communication system in the vehicle can be achieved by appropriately placing the control units mounted in the vehicle into sleep.

REFERENCE SIGNS LIST

1 Vehicle control system (electronic communication system)
2 Central ECU (higher-order control unit)
11 Zone A-ECU (higher-order control unit)
13 Zone B-ECU (higher-order control unit)
33 TCU (vehicle control unit)
35 IVI-ECU (vehicle control unit)
41 Driving assistance ECU (vehicle control unit)
44 Camera
50 ECU (vehicle control unit)
51 FI control unit (vehicle control unit)
52 Motor control unit (vehicle control unit)
53 BATT control unit (vehicle control unit)
54 Gearshift control unit (vehicle control unit)
57 Transmission system
60 ECU (vehicle control unit)
70 ECU (vehicle control unit)
72 Light control unit (vehicle control unit)
76 Electric door control unit (vehicle control unit)
77 A/C control unit (vehicle control unit)
78 PW control unit (vehicle control unit)
81 Entry control unit (vehicle control unit)
82 Lighting system
83 Sensor
84 Communication unit
91, 91A, 91B, 91C Processor
93, 93A, 93B, 93C Memory
94A, 94B, 94C Start-up time period data
95A, 95B, 95C Identification data
96, 96A, 96B, 96C Communication unit
97, 97A, 97B, 97C Communication unit
V Vehicle

What is claimed is:

1. An electronic communication system comprising:

a vehicle control unit that controls a functional unit mounted in a vehicle; and a higher-order control unit, wherein the vehicle control unit and the higher-order control unit are connected through a lower-order communication line, and a plurality of the higher-order control units are connected to each other through a higher-order communication line, the higher-order control unit starts up from a sleep state in response to receiving a first wake-up signal from the vehicle control unit through the lower-order communication line, determines a first transmission period, based on a time period required for another one of the higher-order control units to start up, the another higher-order control unit being connected to the higher-order control unit through the higher-order communication line, and transmits a second wake-up signal to the another higher-order control unit at regular intervals of the determined first transmission period, and the higher-order control unit:

switches between and performs one of an ordinary start-up function and a high-speed start-up function, depending on a function that is a cause for the vehicle control unit to transmit the first wake-up signal;

when performing the ordinary start-up function, transmits the second wake-up signal at intervals of a predetermined second transmission period; and when performing the high-speed start-up function, determines the first transmission period that is different from the second transmission period, based on the time period required for the another higher-order control unit to start up.

2. The electronic communication system according to claim 1, wherein the higher-order control unit determines the first transmission period, based on the time period that was required for the another higher-order control unit to start up in past.

3. The electronic communication system according to claim 1, wherein the higher-order control unit determines the first transmission period in such a manner that the time period that was required for the another higher-order control unit to start up in past is a multiple of the first transmission period.

4. The electronic communication system according to claim 1, wherein the vehicle control unit transmits the first wake-up signal at intervals of a predetermined third transmission period, and the higher-order control unit is capable of transmitting the second wake-up signal at intervals of the first transmission period that is variable, and transmits the second wake-up signal after performing operation of determining the first transmission period.

5. The electronic communication system according to claim 1, wherein the higher-order control unit transmits a data frame including control data on the vehicle control unit at intervals of a predetermined fourth transmission period, and transmits the second wake-up signal at intervals of the first transmission period.

6. A signal transmission method in an electronic communication system in which a vehicle control unit and a higher-order control unit are connected through a lower-order communication line, and a plurality of the higher-order control units are connected to each other through a higher-order communication line, the vehicle control unit controlling a functional unit mounted in a vehicle, the signal transmission method comprising:

causing the higher-order control unit to start up from a sleep state by the vehicle control unit transmitting a first wake-up signal to the higher-order control unit through the lower-order communication line; and by the higher-order control unit, determining a first transmission period, based on a time period required for another one of the higher-order control units to start up, the another higher-order control unit being connected to the higher-order control unit through the higher-order communication line, and transmitting a second wake-up signal to the another higher-order control unit at regular intervals of the determined first transmission period, wherein the signal transmission method further comprises, by the higher-order control unit:

switching between and performing one of an ordinary start-up function and a high-speed start-up function, depending on a function that is a cause for the vehicle control unit to transmit the first wake-up signal;

when performing the ordinary start-up function, transmitting the second wake-up signal at intervals of a predetermined second transmission period; and when performing the high-speed start-up function, determining the first transmission period that is different from the second transmission period, based on the time period required for the another higher-order control unit to start up.

7. An electronic communication system comprising:

a vehicle control unit that controls a functional unit mounted in a vehicle; and a higher-order control unit, wherein the vehicle control unit and the higher-order control unit are connected through a lower-order communication line, and a plurality of the higher-order control units are connected to each other through a higher-order communication line, and the higher-order control unit starts up from a sleep state in response to receiving a first wake-up signal from the vehicle control unit through the lower-order communication line, determines a first transmission period, based on a time period required for another one of the higher-order control units to start up, the another higher-order control unit being connected to the higher-order control unit through the higher-order communication line, and transmits a second wake-up signal to the another higher-order control unit at regular intervals of the determined first transmission period, the higher-order control unit determines the first transmission period, based on the time period that was required for the another higher-order control unit to start up in past.

* * * * *